United States Patent
Hujer et al.

[11] 3,787,702
[45] Jan. 22, 1974

[54] APPARATUS FOR DETECTING AND EVALUATING INDICIA ON PROCESSED PHOTOGRAPHIC FILM OR THE LIKE

[75] Inventors: Friedrich Hujer; Walter Knapp, both of Munich, Germany

[73] Assignee: Agfa-Gevaert Aktiengesellschaft, Leverkusen, Germany

[22] Filed: Sept. 1, 1971

[21] Appl. No.: 176,924

[30] Foreign Application Priority Data
Sept. 5, 1970  Germany............................ 2044116
Sept. 5, 1970  Germany............................ 7033182

[52] U.S. Cl. .................... 250/561, 235/61.11 E
[51] Int. Cl. ........................................ G01n 21/30
[58] Field of Search....... 250/219 D, 219 DR, 219 F, 250/208, 209; 235/61.11 E; 307/311

[56] References Cited
UNITED STATES PATENTS

| | | | |
|---|---|---|---|
| 3,517,167 | 6/1970 | Bell | 250/205 |
| 3,337,717 | 8/1967 | Cerf | 235/61.11 E |
| 3,562,494 | 2/1971 | Schmidt | 250/219 D |
| 3,564,267 | 2/1971 | Walter | 250/219 D |
| 3,523,191 | 8/1970 | Street | 250/219 D |
| 2,720,810 | 10/1955 | Senn | 250/219 D |
| 3,436,553 | 4/1969 | Bevis | 250/219 D |
| 3,604,941 | 9/1971 | Crum | 250/219 DR |
| 3,563,143 | 2/1971 | Petersen | 250/209 |
| 3,439,176 | 4/1969 | Astley | 250/219 DR |
| 3,545,350 | 12/1970 | Gross | 250/209 |
| 3,448,275 | 6/1969 | Hall | 250/208 |
| 3,603,950 | 9/1971 | Hartford | 250/219 D |

*Primary Examiner*—Archie R. Borchelt
*Assistant Examiner*—D. C. Nelms
*Attorney, Agent, or Firm*—Michael S. Striker

[57] ABSTRACT

Graphite marks at one side of a travelling web of processed photographic film are tracked by a battery of photosensitive detectors each of which scans a discrete strip-shaped section of the web. The output signals from the light-sensitive elements of the detectors are transmitted to an OR-gate which controls an operational amplifier serving to arrest the web in response to detection of a mark by at least one detector. The width of the strip-shaped sections which are scanned by the detectors is a small fraction of the width of a graphite mark. The operational amplifier does not arrest the web when the detectors detect indicia other than the graphite marks which are applied to the web in order to insure stoppage of the web whenever a frame line between two film frames moves into register with a severing device.

21 Claims, 5 Drawing Figures

PATENTED JAN 22 1974
3,787,702

INVENTOR
FRIEDRICH HUJER
WALTER KNAPP
BY

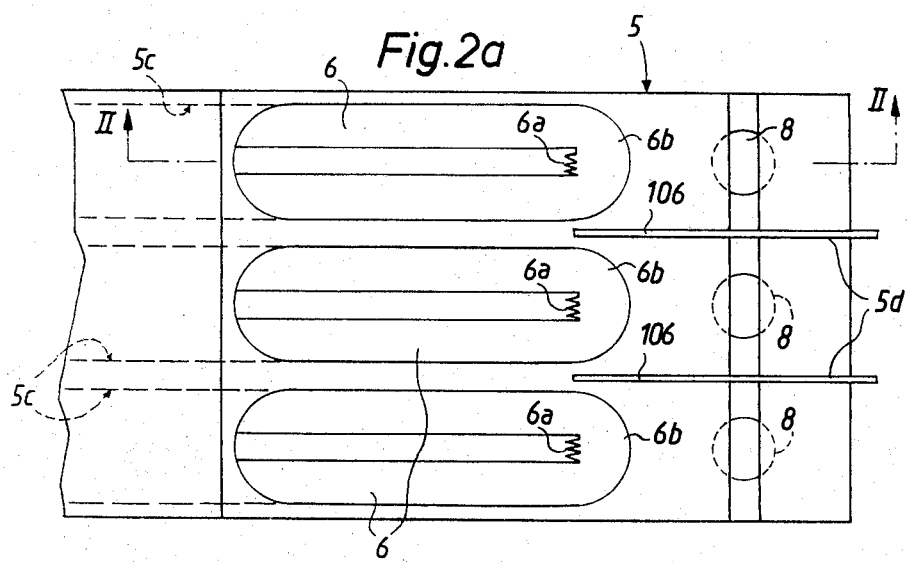

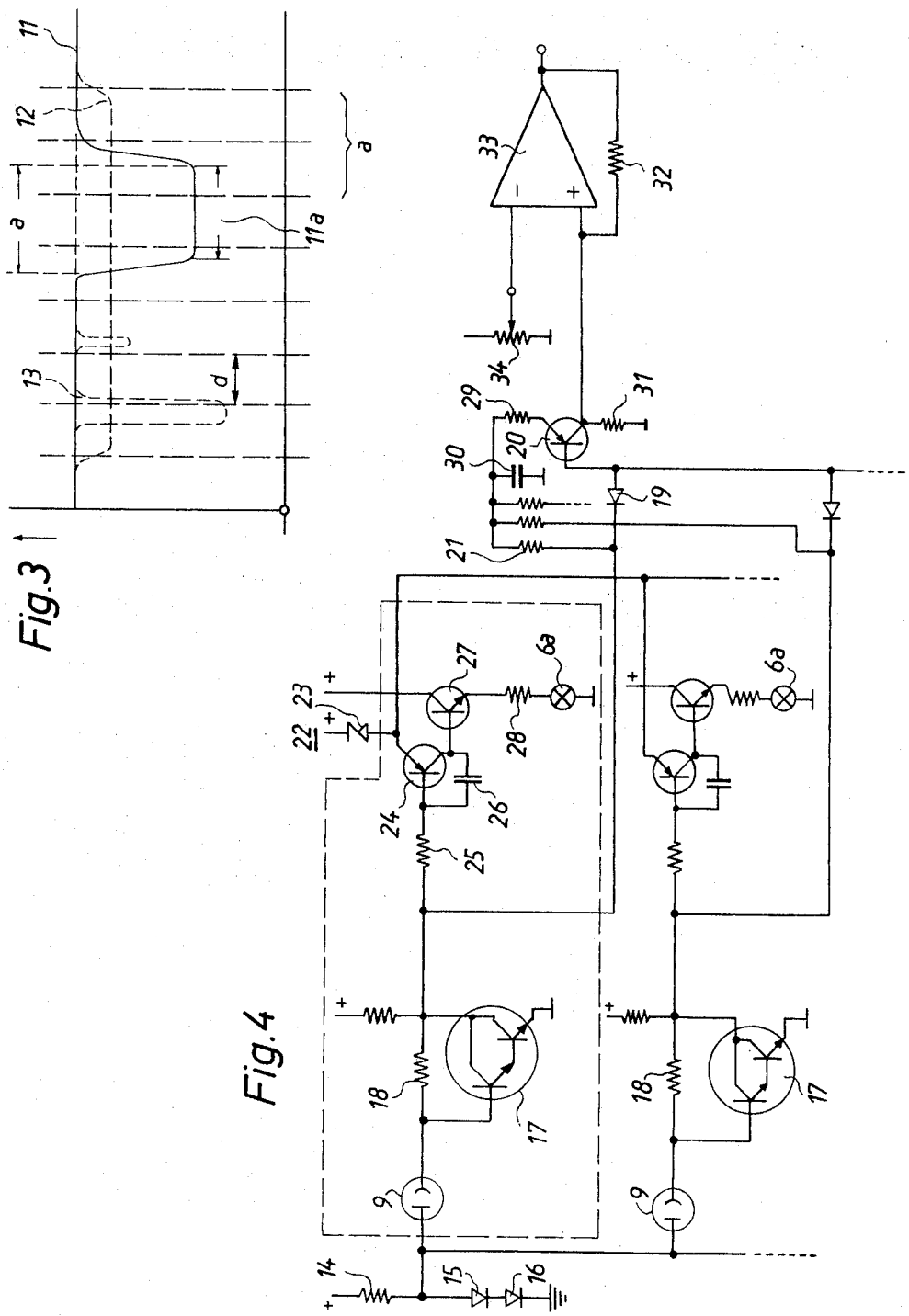

APPARATUS FOR DETECTING AND EVALUATING INDICIA ON PROCESSED PHOTOGRAPHIC FILM OR THE LIKE

BACKGROUND OF THE INVENTION

The present invention relates to apparatus for detecting indicia on webs of processed photographic film or the like. More particularly, the invention relates to improvements in apparatus for photoelectrically scanning graphite marks or other indicia on a moving web of paper or the like.

Scanning apparatus are utilized in laboratories for processing photographic film, for making prints from photographic film and for making reproductions of photographic prints or other originals. For example, when a web of photographic roll film leaves the developing station, it must be severed midway across the frame lines between adjoining images to yield discrete prints or transparencies. The web is normally provided with indicia representing the customer number and with indicia which must be scanned to allow for generation of signals which are utilized to arrest the web whenever a frame line is in proper register with a cutter which severs the strip to separate therefrom a discrete print or transparency. Analogously, a web of paper issuing from a roll copying machine is provided with indicia serving to facilitate the generation of signals which are used to arrest the web at such intervals that the web can be subdivided into prints by a cutter which severs the web midway across the frame lines.

In many instances, the indicia are in the form of graphite marks which are applied to the rear side of a web at intervals corresponding to the spacing between the frame lines at the front side of the web. The graphite marks can be applied by a small rotary graphite wheel which is caused to intermittently contact the rear side of the web. Such marks can be readily detected due to very low resistance which they offer to the flow of electric current or by photoelectric means.

Problems arise when the graphite marks or similar indicia are not applied with a high degree of accuracy as well as when the opacity of applied graphite layers varies from mark to mark, for example, due to partial erasure of certain marks during transport of the web through a copying, printing or developing machine. In many instances, the marks are not located at the same distance from the marginal portions of the web so that a single scanning apparatus which is designed to scan a certain width of the rear side of a travelling web is likely to miss one or more marks.

Furthermore, since the rear side of a travelling web whose front side carries a series of exposed and developed images is often provided with additional indicia denoting customer numbers and/or other information, a photoelectric scanning device is likely to produce signals in response to detection of indicia other than those which are applied to the web for the purpose of insuring stoppage at the exact moment when a frame line at the front side of the web is in accurate register with the knife or knives of the severing device.

SUMMARY OF THE INVENTION

An object of the invention is to provide a scanning apparatus which is capable of detecting indicia of different characteristics as well as of detecting indicia whose positions deviate from an optimum position at one side of a travelling web of paper or the like.

Another object of the invention is to provide a scanning apparatus which can reliably detect indicia of more or less pronounced opacity and/or indicia whose distance from an optimum position is a multiple of the maximum dimensions of such indicia.

A further object of the invention is to provide an apparatus which can properly detect and evaluate various types of indicia and is capable of reliably discriminating between two or more types of indicia.

An additional object of the invention is to provide an apparatus which can be utilized to effect stoppage of a travelling web in response to detection of a single type of marks among two or more different types of marks.

Another object of the invention is to provide the scanning apparatus with novel and improved detectors which can readily discriminate between several types of similar indicia or marks and which can be used in presently known machines for the processing of webs which are coated with photosensitive material or for the processing of other types of strip stock.

Still another object of the invention is to provide the apparatus with novel means for evaluating and utilizing the signals which are produced by the aforementioned detectors in response to detection of one or more different types of indicia.

The improved apparatus serves for detection and evaluation of indicia which are applied at longitudinally spaced intervals to one side of a web consisting of paper or the like and travelling lengthwise along a predetermined path whereby each of the indicia at one side of the web has a predetermined width as considered at right angles to the direction of lengthwise movement of the web. The apparatus comprises a plurality of preferably identical photoelectric detectors adjacent to a portion of the path for the web so that each thereof scans a different strip of one side of the web for the presence of indicia and is arranged to produce first signals in response to detection of indicia and second signals in response to detection of the absence of indicia, the width of each strip being less than (preferably less than one-half) the width of an indicium, and common evaluating means which is connected with the detectors to produce a further signal in response to reception of at least one first signal. Such evaluating means can produce signals which are utilized to arrest the web in response to detection of indicia whereby the arrested web can be severed, for example, across a frame line between successive images at the other side of the web.

The novel features which are considered as characteristic of the invention are set forth in particular in the appended claims. The improved apparatus itself, however, both as to its construction and its mode of operation, together with additional features and advantages thereof, will be best understood upon persual of the following detailed description of certain specific embodiments with reference to the accompanying drawing.

BRIEF DESCRIPTION OF THE DRAWING

FIG. 2 is a longitudinal vertical sectional view of a detector in the apparatus of the present invention, the section being taken in the direction of arrows as seen from the line II—II of FIG. 2a;

FIG. 2a is a plan view of three detectors, substantially as seen in the direction of arrows from the line IIa—IIa of FIG. 2;

FIG. 3 is a diagram showing the types of signals which can be produced by the detectors; and FIG. 4 is a diagram of the electric circuit of the apparatus.

DESCRIPTION OF THE PREFERRED EMBODIMENTS

Figure 1:
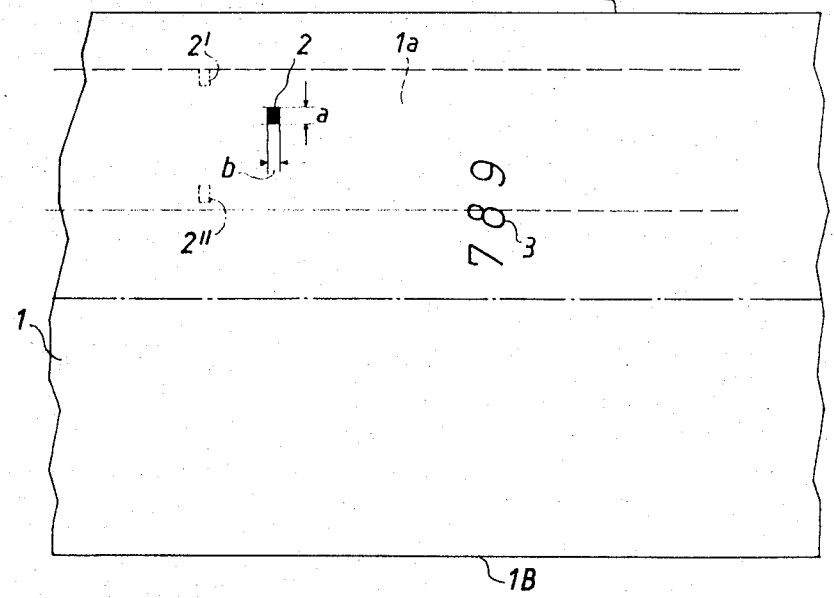
FIG. 1 is a plan view of one side of a portion of a web of processed photographic film which is provided with two types of detectable indicia.

Referring to the drawing in detail, and first to FIG. 1, there is shown the rear side of a portion of a web 1 the front side of which is assumed to carry a series of exposed frames separated from each other by customary frame lines, not shown. In order to facilitate stoppage of the web 1 at the exact moment when a frame line registers with a severing device, not shown, the rear side of the web is provided with longitudinally spaced indicia in the form of rectangular or square graphite marks 2 (only one shown). The illustrated mark 2 is assumed to have been applied by the peripheral surface of a small graphite wheel which is intermittently advanced against and withdrawn from the rear side of the web 1. The reference character $a$ denotes the width of the mark 2 as considered at right angles to the longitudinal direction of the web 1, and the reference character $b$ denotes the length of the mark 2 as considered in the longitudinal direction of the web.

Due to differences in adjustment of the copying or developing machine through which the web 1 has been caused to pass, the position of the mark 2 with reference to the marginal portions 1A, 1B of the web may vary within a wide range, namely, within the field 1a which is bounded by two broken lines. For example, the graphite mark can be applied in the position 2' closely adjacent to the marginal portion 1A or in the position 2'' remote from the marginal portion 1A and adjacent to the inner boundary of the field 1a. The mark 2 is applied in the printing or developing machine during or subsequent to the developing or printing operation. It will be noted that the maximum variation in the positioning of mark 2 with reference to the marginal portion 1A may be a multiple of the width $a$.

Furthermore, the rear side of the web 1 is provided with additional indicia here shown as including an indicium 3 representing the number "789" which is assumed to be the customer number and is applied to facilitate automatic, semiautomatic or manual classification of prints for the purpose of inserting such prints into proper customer envelopes. Also, the indicium 3 may represent the correction values which may include information concerning the exposure values during reproduction of the image of the respective original. The thin lines of the digits forming the indicium 3 are normally not as pronounced (not as opaque) as the mark but they do extend into the field 1a so that a conventional scanning device would be likely to produce signals at inappropriate times, i.e., at such times when a frame line is not in exact registry with a knife or knives of a severing device which subdivides the web 1 into a number of discrete prints.

In accordance with a feature of the invention, the apparatus for detecting and evaluating the marks 2 at the rear side of the web 1 comprises a set or battery of photoelectric detectors each having a light source, an optical system arranged to direct a beam of light against a predetermined strip-shaped section of the field 1a and a light sensitive signal generating element against which the reflected light impinges so that the latter generates a first signal when the respective light beam is reflected on a mark 2 and a second signal when the light beam is reflected on a less opaque portion of the web. In the embodiment which is shown in the drawing, the apparatus comprises three photoelectric detectors but it is clear that the number of such detectors can greatly exceed three. The three detectors can be disposed in a single row extending transversely of the direction of lengthwise movement of the web 1. The width of the area scanned by each detector is less than the width $a$ of a mark 2, preferably less than a/2.

Figure 2:
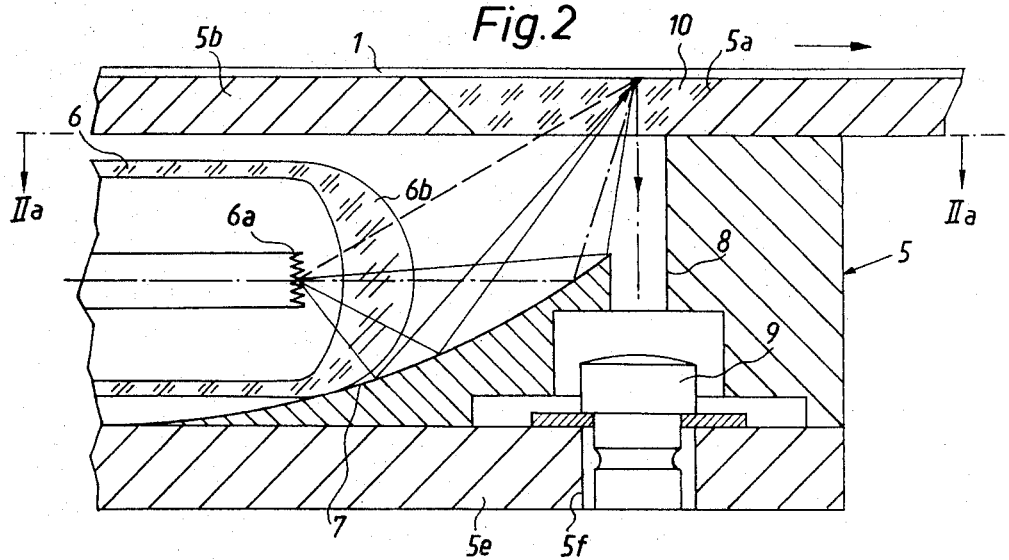

As shown in FIGS. 2 and 2a, the three detectors comprise a common housing or casing 5 which is mounted at a level below the path of movement of the web 1, it being assumed that the frames and frame lines are located at the upper side and that the marks 2 are located at the underside of that portion of the web 1 which travels above the housing 5. This housing accommodates three light sources in the form of filaments 6a, three tubular envelopes 6, one for each light source 6a and each consisting of transparent glass, three reflectors 7, and three light sensitive elements 9. Each envelope 6 extends in parallelism with the direction of movement of the web 1 and its front end portion constitutes a lens 6b. The envelopes 6 are received in recesses or bores 5c of the housing 5. The light beam which issues from a source 6a in the interior of the respective envelope 6 is focussed by the lens 6b against the concave surface of the respective reflector 7 and is caused to impinge against the respective strip-shaped section of the field 1a at the underside of the web 1. Tubular envelopes, such as the envelopes 6 of FIGS. 2 and 2a, are available on the market with diameters from 2 millimeters up. As stated above, the photoelectric detectors are disposed in a row with the envelopes 6 for adjoining light sources 6a placed side-by-side. The row preferably extends at right angles to the longitudinal direction of the web 1. The adjoining envelopes are separated from each other by suitable partitioning means in the form of opaque masks 106 to insure that light issuing from a source 6a can impinge only on the corresponding strip-shaped section of the field 1a. The housing 5 is provided with a plate-like cover 5b having openings or windows 5a which can accommodate transparent glass panes 10 to prevent entry of foreign matter. The light issuing from a source 6a passes through the respective pane 10 to be reflected on the corresponding strip-shaped section of the field 1a. The reflectors 7 constitute concave mirrors which insure that light issuing from the respective sources 6a will be reflected forwardly and will pass through the respective windows 5a to reach the underside of the travelling web 1. The curvature of each reflector 7 preferably corresponds to that of an ellipse one focus of which is located at the source 6a and the other focus of which is located at the point where the reflected light beam impinges on the underside of the web 1. A duct 8 is located immediately below the second focus of the ellipse (i.e., directly below the point where the light beam which is reflected by the concave surface of the reflector 7 impinges against the underside of the web 1) to direct non-oriented stray light to the respective light sensitive element 9. It will be noted that the ducts 8 do not directly receive that light which is being reflected on the concave surfaces of the respective reflectors 7. This insures that light which reaches an element 9 varies between a maximum intensity when not reflected on a mark 2 and a minimum intensity when reflected by a mark 2 above the respective window 5a. The differences between the intensities of light which is reflected by the rear side of the web 1 and light which is reflected by a mark 2 are much less pronounced if the duct 8 is positioned so that the reflected light can impinge directly on the light-sensitive surfaces of the elements 9. This has been found to hold true for webs which are coated with adhesive, for paper webs which are coated with synthetic plastic material as well as for webs which are provided with marks that are exposed onto their photosensitive surfaces during printing. In other words, it has been found desirable to position the light sensitive element 9 of each detector in such a way that the elements 9 receive stray light, not only from the respective strip-shaped sections of the field 1a but also from a detected mark 2.

It was further found that, in order to reduce manufacturing costs, the curvature of the reflecting surface of each reflector 7 need not be identical with but may approximate the curvature of an ellipse. As a rule, it suffices if the curvature of the concave surface of each reflector 7 approximates the curvature of the larger auxiliary circle of an ellipse having one focus at or close to a light source 6a and the other focus at or close to the point where the respective light beam impinges on the web 1.

The partitions 106 are received in slots 5d of the housing 5.

The housing 5 is preferably flat and may consist of aluminum or another light metal. The cover 5b of the housing 5 serves as a guide on which the web 1 travels along a predetermined path, and this cover is provided with the aforementioned openings 5a and window panes 10. The underside of the housing 6 rests on a base plate 5e consisting of insulating material and preferably serving as a carrier for printed circuits of the type shown in FIG. 4. Such printed circuits can be applied to the upper side, to the underside or to both sides of the base plate 5e whose upper side and/or underside is provided with conductors consisting of copper or the like to establish electrical connections between various electrical and electronic components of the printed circuits. The material of the cover 5b is opaque and each of the windows 5a is an elongated slit in the cover 5b.

The diameters of the bores 5c in the housing 5 depend on the diameters of available envelopes 6; very small envelopes are preferred, especially if the scanning and evaluating apparatus is to employ a large number of closely adjacent detectors. As mentioned before, envelopes of the type capable of being used in the detectors shown in FIGS. 2 and 2a can be obtained in sizes having a diameter of 2 millimeters or more. If the apparatus employs envelopes 6 with a diameter of 2 millimeters, the height of a housing 5 need not appreciably exceed 3 millimeters. The envelope 6 for each light source 6a is preferably a thin-walled glass tube the front portion of which forms the aforementioned lens 6b located in front of the light source 6a. The focal length of each lens 6b is such that the light beam issuing from the light source 6a resembles a cone with a relatively small apex angle.

The reflectors 7 can be formed as integral parts of the housing 5 by resorting to a suitable disk-shaped milling or grinding tool. The curvature of concave surfaces of the reflectors 7 has been discussed above in connection with FIG. 2. As known, the curvature of the larger-diameter auxiliary circle of an ellipse is a sufficiently close approximation of the curvature of the less curved part of an ellipse. The concave surface of each reflector 7 is finished to a high degree of reflectivity so that it can reflect light against the underside of the web 1 at an angle of approximately 45 degrees; such light passes through the respective window 5a.

Each duct 8 is normal to the direction of lengthwise travel of the web 1 and directs stray light against the light-sensitive surface at the upper end of the respective light sensitive element 9. This element may be a resistor or a phototube; the operation of the circuit shown in FIG. 4 is affected very little if the elements 9 in the form of resistors are replaced by elements 9 in the form of phototubes or vice versa. Th elements 9 are mounted in bores 5f provided therefor in the base plate 5e. The diameter or maximum transverse dimension of the duct 8 (which may but need not be of circular cross-sectional outline) is preferably small, for example, in the range of one or more tenths of a millimeter. The dimensions of the elements 9 are selected in such a way that they insure reliable resolution of relatively small marks 2 with sharply defined outlines.

The masks 106 between the light sources 6a of adjoining detectors are of importance not only to insure that each light source illuminates a discrete strip-shaped section of the underside of the web 1 without any appreciable overlapping of such sections but also in connection with the operation of the amplifier systems 22 of FIG. 4 which can insure that all detectors furnish signals of identical intensity when the light beams fail to impinge upon marks 2. It was found that, due to the fact that the ducts 8 prevent exposure of the elements 9 to light which issues directly from the respective light sources 6a or is directly reflected on a mark 2 or another portion of the underside of the web 1, a shiny graphite mark can be detected with the same facility as a matte non-opaque surface. Since the remainder of the underside of the web 1 is normally shiny, the ability of elements 9 to reliably detect shiny graphite marks in a shiny background enables the improved scanning apparatus to detect graphite marks and to produce signals for intermittent stoppage of the web 1 with much greater reliability than heretofore known scanning apparatus.

Certain presently known scanning apparatus which are used to detect the presence of the graphite marks or analogous indicia on webs which are provided with images separated from each other by frame lines employ a detector having a relatively large lamp and a pair of lenses serving to form two parallel light beams which travel in parallelism with the direction of movement of the web and are thereupon deflected by a prism so as to impinge against the marked surface of the web at an angle of approximately 90°. A single light sensitive element is positioned at an obtuse angle to the marked surface of the travelling web. Such detectors occupy much more room than the above-described detectors and they are incapable of detecting marks which are applied at a varying distance from one marginal portion of the web. Furthermore, the prism and the lenses contribute excessively to the initial cost of such conventional detectors. In contrast to such conventional detectors, the apparatus of the present invention can employ detectors which occupy surprisingly little room, especially as measured at right angles to the directon of lengthwise movement of the web.

An important advantage of detectors which can scan relatively narrow strips at the rear side of the web 1 is that at least one light sensitive element receives light which is reflected only by a mark 2 when such mark moves into that portion of the path for the web 1 (above the housing 5 of the detectors) in which such mark fully overlies at least one glass pane 10. This renders it possible to reliably detect marks 2 whose opacity varies within a wide range, not only from mark to mark but also from portion to portion of a single mark. Furthermore, the aforementioned amplifier systems 22 for the detectors insure that the operational amplifier or evaluating means 33 of the circuit shown in FIG. 4 can produce signals only in response to detection of marks 2 but not in response to detection of indicia 3 and/or other indicia which are of such configuration that they cannot reflect all of the light which issues from the light source of a single detector.

The diagram of FIG. 3 illustrates those light intensity ranges which are detected by the detectors of the improved scanning and evaluating apparatus. The horizontal plateaus or peaks of the curve 11 represent those light intensities which develop when the beam issuing from a source 6a and being reflected by the concave surface of the respective reflector 7 impinges on an unmarked portion of the rear side of the web 1. The portion 11a of the curve 11 represents that intensity which develops when the light beam impinges on a clearly defined (black) graphite mark 2. It will be noted that the current furnished by the respective light sensitive element 9 drops to about one-half its normal value when the light sensitive element receives stray light which is reflected on a satisfactory mark 2. The width of the curve portion 11a (as measured along the abscissa of the ordinate system shown in FIG. 3) is selected in such a way that a satisfactory mark 2 can be detected by at least two neighboring detectors. Such width corresponds to the width a of the mark 2 shown in FIG. 1. This insures that the element 9 of at least one of the detectors receives light which is reflected entirely on a passing mark 2. Such distribution and dimensioning of detectors is particularly important if different portions of a mark 2 exhibit different reflectivities.

The broken-line curve 12 of FIG. 3 denotes the variations in current when several detectors detect an indicium (such as one digit of the indicium 3 shown in FIG. 1) which extends across a substantial part of the field 1a shown in FIG. 1. As mentioned above, the opacity of the digits forming the indicium 3 is less pronounced than that of a satisfactory mark 2. It is further assumed that the length of the scanned portion of a digit of the indicium 3 shown in FIG. 1 is less than the length b of a satisfactory mark 2 (as measured in the direction of lengthwise movement of the web 1).

The curves 13 of FIG. 3 denote opaque portions at the rear side of the web 1 whose absorptivity is very high but which are very short, i.e., much shorter than the mark 2 (namely, the length b of the mark 2) so that they cannot cause the generation of signals which would cause stoppage of the web at an inappropriate time. This is due to the fact that the width of the ducts 8 exceeds the width of such relatively narrow opaque areas at the rear side of the web 1 whereby the light which is reflected on such opaque areas is mixed with light which is reflected on the adjoining bright areas and the current furnished by light sensitive elements 9 does not decrease to a value (see the curve portion 11a) which would suffice to cause the generation of a signal for stoppage of the web 1.

The width of a strip-shaped section which can be scanned by a single detector is shown at d. It will be noted that the width a of a mark 2 at least equals 2d.

FIG. 4 illustrates the circuit of the scanning and evaluating apparatus. This circuit insures that only the currents represented by the portion 11a of the curve 11 shown in FIG. 3 will cause a stoppage of the web 1, i.e., that the web is stopped only when one or more detectors of the type shown in FIG. 2 detect a mark 2 irrespective of whether the mark is closely adjacent to or remote from the marginal portion 1A of the web 1.

FIG. 4 merely shows two adjoining light sensitive elements 9, i.e., only the light sensitive elements of two detectors, but it will be understood that the apparatus comprises or may comprise three, four, five, six, seven, eight or more detectors. It was found that an apparatus with three detectors is often satisfactory for reliable detection and evaluation of marks 2 even if the positions of successive marks vary within a certain range. The elements 9 are connected in parallel to each other and are connected to the positive pole of a suitable energy source by way of a resistor 14. Furthermore, each element 9 is connected with the ground by way of two diodes 15, 16. The output signal of the element 9 shown in the upper left-hand portion of FIG. 4 controls a transistor 17 which constitutes an impedance transformer and is in circuit with a negative feedback resistor 18. The illustrated transistor 17 is a Darlington transistor and its output voltage is applied to an evaluating circuit in the form of an OR-gate including a transistor 20 and a signal comparator in the form of an operational amplifier 33. As shown, the output signal from the transistor 17 is applied to the base of the transistor 20 by way of a diode 19 as well as to the emitter of the transistor 20 by way of a resistor 21 which is in series with a further resistor 29. A tap between the resistors 21 and 29 is connected with one plate of a high-capacity condenser 30 the other plate of which is connected with the ground. The collector of the transistor 20 is connected with the ground through a working resistor 31 and is further connected with one input of the operational amplifier 33 which is in circuit with a resistor 32. The signal at the plus input of the amplifier 33 is compared with the signal at the minus input, such signal being furnished by an adjustable potentiometer 34. As shown, the minus input of the amplifier 33 is connected with the sliding contact of the potentiometer 34. The signal from this potentiometer is compared with the signal at the plus input (from the transistor 20) and the output of the amplifier 33 furnishes signals to the conveyor for the web 1.

The output of the transistor 17 is further connected with an amplifier system 22 which maintains the output signal from the light sensitive element 9 at a constant value by way of a time delay capacitor 26. A Zener diode 23 delivers a constant comparing voltage which is the same for all detectors and is applied to the emitter of a first transistor amplifier 24. The base of the transistor 24 is connected with the output of the transistor 17 by way of a resistor 25. The capacitor 26 is connected between the base and collector of the transistor 24; this capacitor serves as a time-delay element of the amplifier system 22. The collector of the transistor 24 is connected with the base of a second transistor amplifier 27. The emitter-collector circuit of the transistor 27 contains the respective light source 6a in series with a resistor 28.

As mentioned above, the just described portion of the circuit is provided for one of the detectors, and the circuit comprises additional portions, one for each of the other detectors. The elements 9 of all detectors are connected to a common energy source and the Zener diode 23 serves to furnish potential to the transistors 24 of all detectors. The output signals of the amplifier systems 22 of all detectors are delivered to the OR-gate which comprises several resistors 21 and several diodes 19, one for each detector. The resistors 21 and diodes 19 are respectively connected in parallel with each other.

The operation of the scanning and evaluating apparatus is as follows:

The web 1 of FIG. 1 is assumed to travel above the housing 5 of the battery of detectors so that the images and frame lines face upwardly. The marks 2 and indicia 3 are assumed to be applied to the uncoated rear side of the web 1, i.e., to that side which faces downwardly toward the housing 5. The light sensitive elements 9 of the detectors furnish voltages which vary as a function of the intensity of incident light. Such intensity depends on the light output of light sources 6a and on that portion of stray light which is reflected at the underside of the web 1 and reaches the respective elements 9 by way of the ducts 8. The voltage signal furnished by the Zener diode 23 for the purpose of comparison causes each element 9 to furnish at the output of the respective transistor 17 a signal which corresponds to the peaks of the curve 11 shown in FIG. 1 when the respective element 9 receives reflected light reflectd on an unmarked portion of the rear side of the travelling web 1. This is due to the fact that the voltage furnished by the diode 23 regulates the voltage for the light sources 6a of all detectors and such regulation takes place with a certain delay which is determined by the capacities of the capacitors 26. Once the brightness of light sources 6a in the detectors is adjusted, the voltage signals at each of the diodes 19 are substantially identical. Such voltage is also applied to the base of the transistor 20. The voltage at the emitter of the transistor 20 depends on the average value of signals at the resistor 21 (as determined by the capacitor 30), i.e., on the average reflectivity of the web 1. Consequently, the transistor 20 blocks when the detector of the scanning apparatus fail to detect opaque spots or marks or indicia at the rear side of the web 1.

If an indicium 3 moves into the range of several light beams reflected by the reflectors 7 against the rear side of the web 1, the corresponding elements 9 produce output signals as indicated by the curve 12 of FIG. 3. The emission of such signals takes place for a period of time preceding the adjustment of voltages for the light sources 6a. The diode 19 which receives the signal of maximum intensity remains conductive and the other diodes block the transmission of signals. Therefore, the collector of the transistor 20 transmits a signal to the amplifier 33, and such signal is compared with the signal from the potentiometer 34. The latter is adjusted in such a way that the amplifier 33 fails to produce a signal which causes a stoppage of the web 1 when the plus input of the amplifier 33 receives a signal in response to detection of an indicium 3, even if the signal from a diode 19 is the maximum-intensity signal produced as a result of detection of a digit of the indicium 3.

If a mark 2 at the rear side of the web 1 moves into the range of light beams furnished by the light sources 6a of two or more detectors, at least one of the elements 9 receives stray light which is reflected exclusively on the mark 2 above the respective glass pane 10. The output voltage of such element 9 drops (see the portion 11a of the curve 11 shown in FIG. 3) and the voltage at the output of the respective transistor 17 drops accordingly to a value which causes the amplifier 33 to produce a signal for stoppage of the web 1. The capacitors 26 are dimensioned in such a way that they prevent an adjustment of voltage for the light sources 6a of the respective detectors during the very short interval of reflection of light on a mark 2.

The amplifier system 22 renders it possible to widen the range within which the transistor 20 emits a signal which causes stoppage of the web 1 without the danger of producing such signals in response to detection of indicia 3 and/or other indicia which cause intensity variations as indicated by the curves 13 of FIG. 3 and/or as a result of aging of electronic components of the circuit. Such wide range is desirable in order to insure that the amplifier 33 will emit signals in response to detection of darker or less opaque marks 2.

It is clear that the OR-gate of the evaluating means in the circuit shown in FIG. 4 can be replaced with other d-c or a-c circuits of known design, as long as such circuits can properly control the generation of signals by the amplifier 33 which in turn controls the drive for the web 1. The drive arrests the web 1 at the exact moment when a frame line at the upper side of the web registers with a cutting or severing device which separates a discrete print or transparency from the remainder of the web. The latter is then set in motion until one of the detectors detects the next-following mark 2.

Three detectors will suffice if the web is guided with a resonable degree of accuracy during the application and scanning of the marks 2, i.e., if the web is not allowed to perform excessive sidewise movements while advancing past a graphite wheel and the battery of detectors.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims:

1. Apparatus for detecting and evaluating indicia applied at longitudinally spaced intervals to one side of a web which travels lengthwise along a predetermined path and wherein each of said indicia has a predetermined width as considered at right angles to the direction of travel of the web and an opacity deviating from that of the remainder of said one side of the web, comprising a plurality of identical photoelectric detectors adjacent to a portion of said path so that each detector scans a different strip-shaped section of said one side of the web for the presence of indicia and produces first signals in response to detection of indicia and second signals in response to detection of the absence of indicia, the width of said strip-shaped sections being less than said predetermined width and each of said detectors comprising a light source arranged to direct a beam of light against the respective strip-shaped section of the travelling web, a light sensitive element which produces said first and second signals and an amplifier system arranged to regulate the intensity of light issuing from said source so as to respectively equalize said first and second signals; and common evaluating means connected with said detectors to produce a further signal in response to reception of at least one first signal, each of said amplifier systems comprising time-delay means arranged to delay the equalization of said first and second signals so as to insure that first signals produced on detection of said indicia are transmitted to said evaluating means.

2. Apparatus as defined in claim 1, wherein each of said detectors further comprises a concave reflector arranged to deflect the respective light beam against the corresponding strip-shaped section, the curvature of said reflector being identical with or approximating the curvature of an ellipse having a first focus at least closely approximating the respective light source and a second focus at least closely approximating the point where the reflected light beam impinges upon said one side of the web.

3. Apparatus as defined in claim 2, wherein the light beams emitted by said sources are parallel with the direction of travel of the web.

4. Apparatus as defined in claim 2, wherein the curvature of each of said reflectors equals or approximates that of the larger auxiliary circle of the respective ellipse.

5. Apparatus as defined in claim 2, wherein each of said detectors further comprises a transparent tubular envelope for the respective light source.

6. Apparatus as defined in claim 5, wherein each of said envelopes comprises a lens at one end thereof, said lens being disposed between the respective light source and the associated reflector.

7. Apparatus as defined in claim 6, further comprising housing means for said envelopes, said housing means having elongated recesses extending in substantial parallelism with the direction of travel of the web and each accommodating one of said envelopes.

8. Apparatus as defined in claim 2, further comprising opaque partitioning means disposed between the light sources of said detectors.

9. Apparatus as defined in claim 8, further comprising housing means for said detectors, said housing means having slots for said partitioning means.

10. Apparatus as defined in claim 1, wherein the width of said strip-shaped sections at most equals one-half of said predetermined width.

11. Apparatus as defined in claim 1, wherein the opacity of the major part of said one side of the web is less than the opacity of said indicia.

12. Apparatus as defined in claim 1, wherein each of said detectors further comprises means for shielding the respective light sensitive element against direct impingement of light issuing from the respective light source and against direct impingement of light which is reflected by the travelling web, each of said light sensitive elements being exposed to stray light which is reflected by said one side of the web.

13. Apparatus as defined in claim 1, wherein said evaluating means comprises an OR-gate.

14. Apparatus as defined in claim 13, wherein said evaluating means further comprises a circuit which is arranged to receive from said OR-gate signals exceeding a predetermined threshold value.

15. Apparatus for detecting and evaluating indicia applied at longitudinally spaced intervals to one side of a web which travels lengthwise along a predetermined path and wherein each of said indicia has a predetermined width as considered at right angles to the direction of travel of the web and an opacity deviating from that of the remainder of said one side of the web, comprising a plurality of identical photoelectric detectors adjacent to a portion of said path so that each detector scans a different strip-shaped section of said one side of the web for the presence of indicia and produces first signals in response to detection of indicia and second signals in response to detection of the absence of indicia, the width of said strip-shaped sections being less than said predetermined width and each of said detectors comprising a variable-intensity light source arranged to illuminate the respective strip-shaped section of the web, a light sensitive element located in the path of light which is reflected by the web to respectively produce said first and second signals in response to exposure to light which is respectively reflected by an indicium and by an unmarked portion of the respective strip-shaped section, and an amplifier system having means for comparing the intensities of signals furnished by the light sensitive elements of all detectors with the intensity of a predetermined signal and for varying the intensities of said light sources as a function of the results of such comparison, each of said amplifier systems further comprising two transistors with the base of one of said transistors connected to the respective light sensitive element and the emitter of said one transistor connected to said signal comparing means, the collector of said one transistor being connected with the base of the other transistor and said other transistor having an emitter-collector circuit which includes the respective light source, each of said amplifier systems further comprising time-delay means connected between the base and collector of said one transistor; and common evaluating means connected with said detectors to produce a further signal in response to reception of at least one first signal.

16. Apparatus as defined in claim 15, wherein said signal comparing means is a Zener diode.

17. Apparatus as defined in claim 15, wherein each of said time-delay means comprises a capacitor.

18. Apparatus for detecting and evaluating indicia applied at longitudinally spaced intervals to one side of a web which travels lengthwise along a predetermined path wherein each of said indicia has a predetermined width as considered at right angles to the direction of travel of the web and an opacity deviating from that of the remainder of said one side of the web, comprising a plurality of identical photoelectric detectors adjacent to a portion of said path so that each detector scans a different strip-shaped section of said one side of the web for the presence of indicia and produces first signals in response to detection of indicia and second signals in response to detection of the absence of indicia, the width of said strip-shaped sections being less than said predetermined width and each of said detectors comprising variable-intensity light source arranged to illuminate the respective strip-shaped sections of the web, a light sensitive element located in the path of light which is reflected by the web to respectively produce said first and second signals in response to exposure to light which is respectively by an indicium and by an unmarked portion of the respective strip-shaped section, and an amplifier system having means for comparing the intensities of signals furnished by the light sensitive elements of all detectors with the intensity of a predetermined signal and for varying the intensities of said light sources as a function of the results of such comparison; and common evaluating means connected with said detectors to produce a further signal in response to reception of at least one first signal.

19. Apparatus as defined in claim 18, wherein said evaluating means comprises a transistor and each of said light sensitive elements is connected with the base of said transistor by way of a discrete diode and with the emitter of said transistor by way of at least one resistor.

20. Apparatus as defined in claim 19, wherein said resistors are connected in parallel and the collector of said transistor is arranged to transmit the maximum-intensity signals received from said light sensitive elements.

21. Apparatus for detecting and evaluating indicia applied at longitudinally spaced intervals to one side of a web which travels lengthwise along a predetermined path and wherein each of said indicia has a predetermined width as considered at right angles to the direction of travel of the web and an opacity deviating from that of the remainder of said one side of the web, comprising a plurality of identical photoelectric detectors adjacent to a portion of said path so that each detector scans a different strip-shaped section of said one side of the web for the presence of indicia and produces first signals in response to detection of indicia and second signals in response to detection of the absence of indicia, the width of said strip-shaped sections being less than said predetermined width and each of said detectors comprising a light source arranged to emit a beam of light, a concave reflector arranged to deflect the respective light beam against the corresponding strip-shaped section, the curvature of said reflector being identical with or approximating the curvature of an ellipse having a first focus at least closely approximating the respective light source and a second focus at least closely approximating the point where the reflected light beam impinges upon said one side of the web, and a light sensitive element located in the path of light which is reflected by said one side of the web and arranged to produce said first and second signals in response to changes in the intensity of reflected light, housing means for said light sources and said light sensitive elements, said housing means having duct means extending substantially at right angles to the direction of lengthwise travel of the web to direct reflected light against said light sensitive elements; and common evaluating means connected with said detectors to produce a further signal in response to reception of at least one first signal.

* * * * *